United States Patent

[11] 3,585,762

| [72] | Inventor | Werner Steinmetz<br>Wetzikon, Switzerland |
|---|---|---|
| [21] | Appl. No. | 770,278 |
| [22] | Filed | Oct. 24, 1968 |
| [45] | Patented | June 22, 1971 |
| [73] | Assignee | Mahog AG<br>Dubendorf, Switzerland |
| [32] | Priority | Oct. 24, 1967 |
| [33] | | Switzerland |
| [31] | | 14829/67 |

[54] DRILL GRINDING MACHINE PARTICULARY FOR SPIRAL DRILLS
14 Claims, 2 Drawing Figs.

| [52] | U.S. Cl. | 51/219 |
|---|---|---|
| [51] | Int. Cl. | B24b 19/00 |
| [50] | Field of Search | 51/219 |

[56] References Cited
UNITED STATES PATENTS
2,866,302   12/1958   Amiet............................   51/219

*Primary Examiner*—Othell M. Simpson
*Attorney*—McGlew and Toren

ABSTRACT: The feeding device includes a pivotal lever which is pivotal lever which is pivotal about an axis oriented at an angle to the axis of the grinding wheel. The pivotal lever is pivotal toward and away from the grinding wheel and carries a chuck for clamping the drill to be ground. The pivotal lever is also displaceable longitudinally of its pivot axis, and is so coupled with a guiding device that the drill end to be ground is fed to the grinding wheel and is relief-ground by leading it along the grinding wheel or disc.

INVENTOR.
WERNER STEINMETZ
BY McGlew and Toren
ATTORNEYS

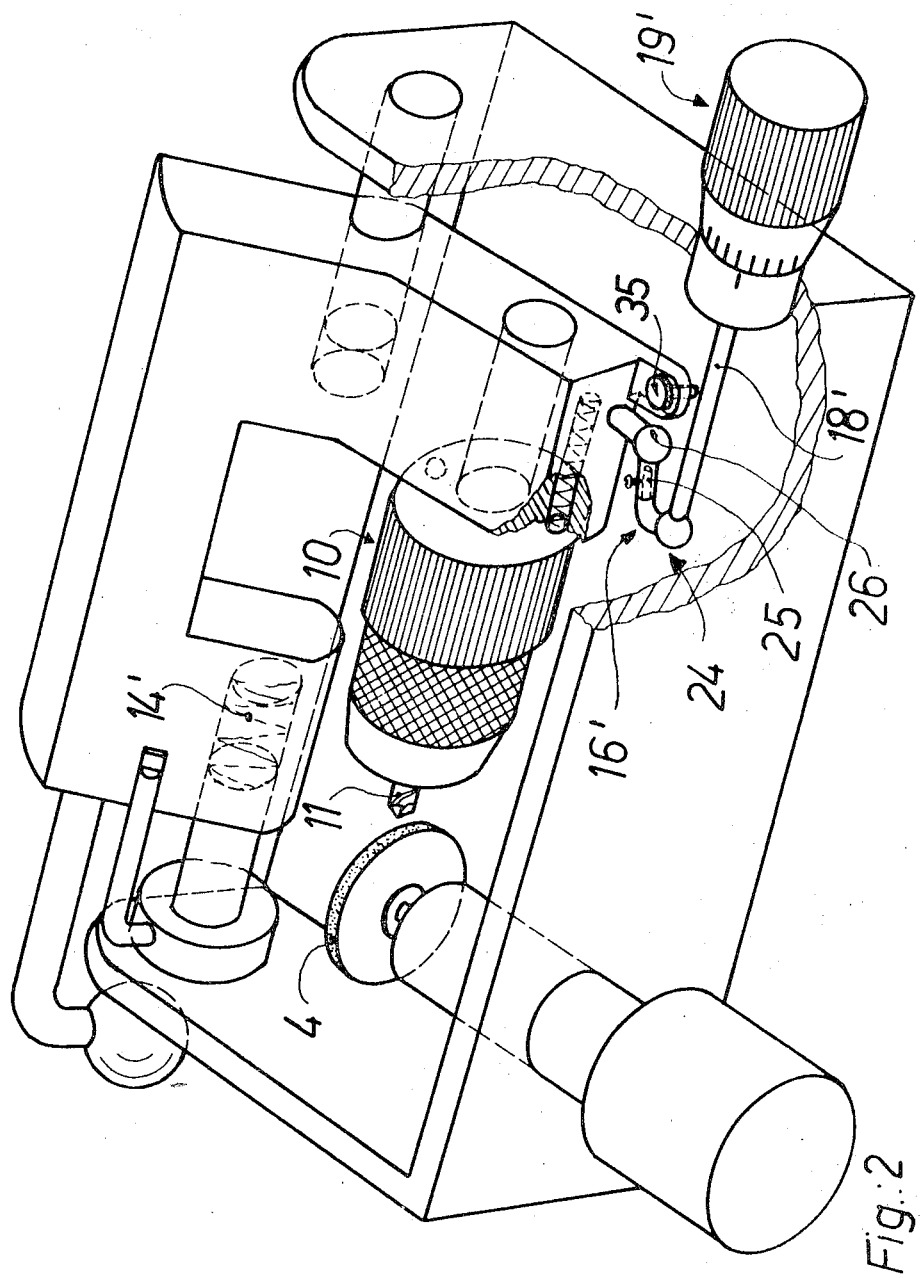

DRILL GRINDING MACHINE PARTICULARY FOR SPIRAL DRILLS

BACKGROUND OF THE INVENTION

Many types and forms of drill-grinding machines are already known, but they all have, in common, complicated constructions. Therefore, they are expensive, cumbersome to handle and highly susceptible to malfunctioning. Such drill-grinding machines are consequently not suitable for use in industries, such as the building trades, for example, where it is not important to precision-grind drills but it is rather important to have a machine that is rugged, simple to handle and inexpensive.

A drill-grinding machine including a pivotal lever is disclosed in German Pat. No. 59,734. In this patent, in order to pivot the lever about its pivot axis, a drill must first be chucked in a chuck of the lever and the drill must be introduced through a guide bushing provided in a ball joint mechanism which determines the pivot axis of the pivotal lever. To guide the pivotal lever, there is provided a guiding cam on the machine frame and along which the pivoting lever is guided by a handle having a stop engageable with the cam.

While the drill grinder of this German patent is very simple, it permits only a relatively inaccurate grinding of drills. Guiding of the drill exactly along the guiding cam depends largely upon how carefully the operator leads the stop or abutment of the pivoting lever along this cam. Also, the multidimensional guiding of the drill by means of the ball joint mechanism results in so much clearance that it is impossible to hold and guide the drill precisely. Moreover, the ball joint mechanism is disposed near the grinding wheel, and thus is exposed constantly to abrasive dust which substantially increases the wear of the already susceptible ball joint mechanism, and thus contributes to its looseness and susceptibility to trouble. In addition, fitting bushings must be inserted into the ball joint mechanism to match the various drill sizes. Different types of grind are not provided for in this drill grinder, are hardly possible, and would result in no advantage whatsoever, considering the inaccuracy of the grinding.

There are also known a number of other drill-grinding devices including simple and robust devices, such as those shown in British Pats. Nos. 479,651 and 209,214, as well as in Swiss Pat. No. 2170 . However, either drills cannot be ground accurately with these devices or else only a single type of grind is possible.

There are also known drill-grinding machines which are designed either for accurate grinding or to perform various types of grinding. Such machines are shown, for example, in German Pat. No. 838,571 and in U.S. Pats. Nos. 2,870,579, 2,907,149 and 2,866,302. However, these drill grinding machines have the disadvantage of being of a very complicated design and thus being trouble prone and often cumbersome to operate. Considering the multiplicity of bearing points and guides provided in such machines, even the smallest wear has a detrimental effect upon the accuracy of the grind. Thus, and due to their complicated, expensive and sensitive designs, as well as their often cumbersome operations, these drill-grinding machines are not suited for applications requiring drill grinding machines which are simple in easy to operate, rugged and priced competitively.

This invention relates to drill-grinding machines and, more particularly, to a drill-grinding machine, particularly for grinding spiral drills, which is inexpensive, rugged and simple to handle and which is effective for accurate grinding of the drills as well as for performing various types of grinds.

The drill-grinding machine of the invention is characterized by the fact that a feeding device is coupled with a guide assembly, which provides for guiding of the drill end to be ground along the surface of a grinding disc, while maintaining alignment of the drill, in such a manner that a relief-ground surface is formed on the drill. Thus, in accordance with the invention, the axis of a chuck which mounts the drill to be ground is oriented parallel to the pivot axis of a pivoting lever on which the chuck is mounted. The pivoting lever is movable axially of its pivot axis against the bias of a spring disposed in the machine frame, and is coupled with the machine frame either through a crank drive or through a guiding cam. In both cases, the coupling includes a fine feeding screw, and the drill end to be ground is fed to and led along the periphery of the grinding wheel or disc.

The grinding disc can have a cylindrical surface and, in such case, the feeding device preferably is so designed that the drill bears on the grinding disc with its axis inclined toward the grinding disc plane at an angle which is complementary to half the included angle of the drill point. In this embodiment of the invention, however, the axis of the feeding device and the axis of the grinding disc are arranged relative to each other at an angle of other than 90°.

Preferably, however, the grinding disc has a surface in the form of a truncated cone, where one half the included angle of the cone is equal to the complementary included angle of the drill point. In this case, the feeding device can be so designed so that the drill bears on the grinding disc with its axis parallel to the plane of the grinding disc.

The feeding device preferably is adjustable in its position relative to the grinding disc, so that drills with different point angles can be ground. The guide assembly preferably is so designed that it permits, both in drills with a right-hand twist and in drills with a left-hand twist, in addition to the common cone shell grinding, two-face grinding, two-face cone shell grinding, four-face grinding and spiral point grinding. While these different types of grinding could be achieved heretofore only with complicated and expensive machines, such achievement is possible, with the present invention, with only a single, extremely simple and thus inexpensive drill-grinding machine. For this purpose there can be used, for example, a device for adjusting the initial vertical position of the drill with respect to the grinding disc. Such a vertical adjustment provides, for example, for setting of the cutting angle of the drill to be ground as desired.

The guide assembly is provided with a guideway, preferably in the form of a guide cam, advantageously arranged between the machine frame and the feeding device. The guideway or guide cam preferably is exchangeable, or adjustable, or both, so that the clearance angle of the relief-ground surface of a drill to be ground can further be varied. The guide assembly can also be a crank drive, arranged preferably between the machine frame and the feeding device, and having a transmission ratio which is preferably variable.

The examples mentioned above also provide for drills to be ground with a spiral point cut. In the spiral point cut, in contrast to the usual types of cut at the tip of the bit edge, the large negative rake angle on the cross cutting edge is somewhat smaller, and the clearance angle is likewise improved in the cutting edges. These two changes result in an improvement of the drill cutout, and in a good self-centering of the drill. In order to obtain such a spiral point cut, the grinding disc or the guide assembly, or both, can be so set that the point of the spiral drill to be ground, while it follows the circumference of the grinding disc, moves away from the circumference of the grinding disc in the direction of a plane surface.

The drill-grinding machine of the invention can be used not only for grinding spiral drills with any angle of twist, but also for grinding drills of other types, for example, centering drills or lip drills. The machine permits an extremely simple, rugged and compact construction, so that it can be designed as a portable device which is also suitable for rugged operation, for example, on construction sites. Despite the simple construction, the drill-grinding machine of the invention provides for making a large number of different cuts.

An object of the invention is to provide an improved and simplified drill-grinding machine, particularly for grinding spiral drills.

Another object of the invention is to provide such a drill-grinding machine which is inexpensive, rugged and easy to handle.

A further object of the invention is to provide such a drill-grinding machine in which a feeding device is coupled with a guide assembly to provide for guiding of a drill end along the surface of a grinding disc while maintaining alignment of the drill and in such a manner that a relief-ground surface is formed on the drill.

Still another object of the invention is to provide such a drill-grinding machine in which the feeding device is adjustable relative to the grinding disc so that drills with different angles of point can be ground.

A further object of the invention is to provide such a drill-grinding machine in which a guide assembly is preferably so designed that it permits, in addition to the most common cone shell cut, also a two face-cone shell cut.

Another object of the invention is to provide such a drill-grinding machine in which the guide assembly is provided with a guide way which is preferably exchangeable, adjustable, or both, so that the clearance angle of a relief-ground surface of a drill can be varied further.

For an understanding of the principles of the invention, reference is made to the following description of typical embodiments thereof as illustrated in the accompanying drawings.

BRIEF DESCRIPTION OF THE DRAWINGS

In the Drawings:

FIG. 2 is a perspective view, partly broken away, of a drill-grinding machine of the type shown in FIG. 1, but with a crank drive.

DESCRIPTION OF THE PREFERRED EMBODIMENTS

Figure 1:
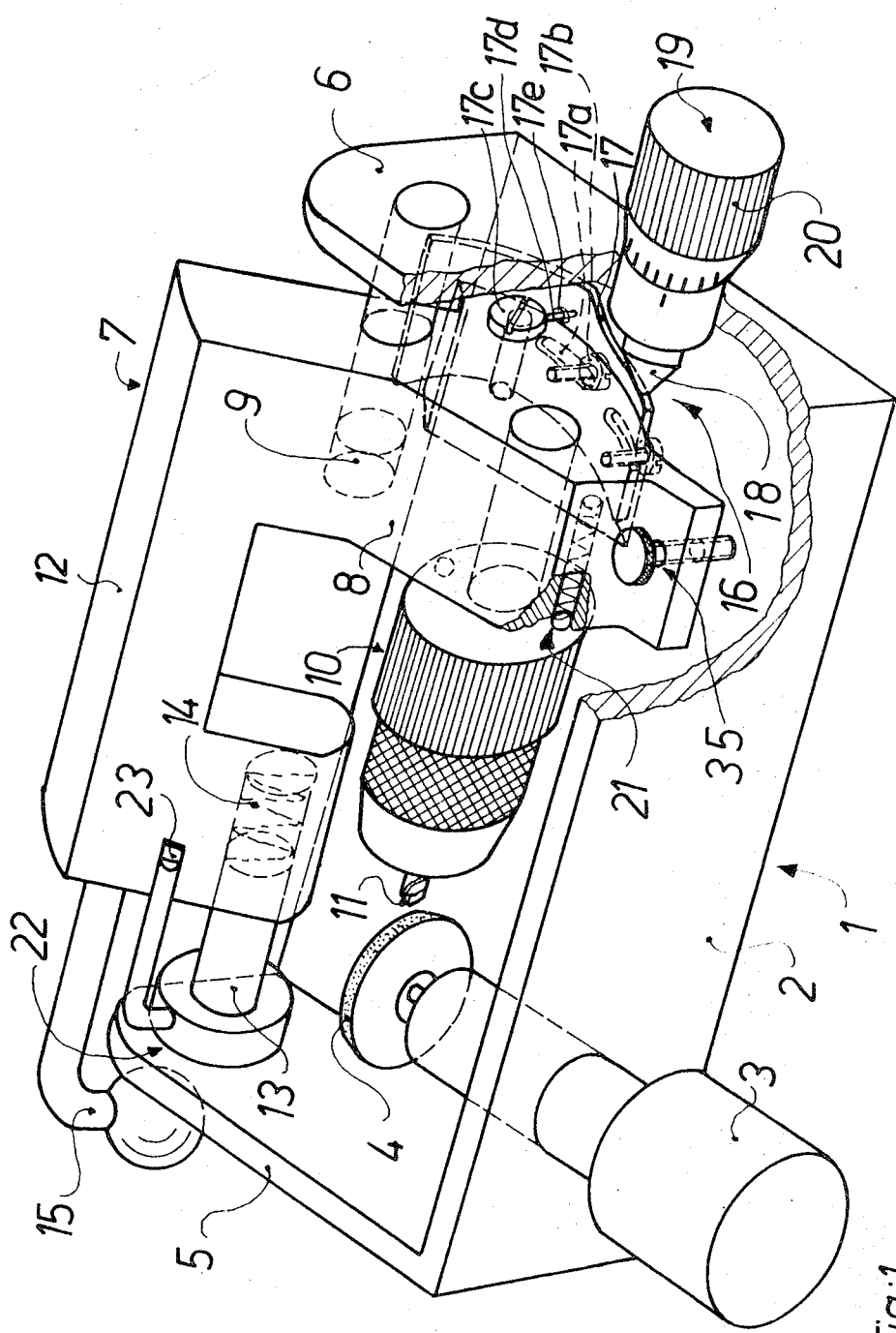
FIG. 1 is a perspective view, partly broken away, of a drill-grinding machine embodying the invention and including a drill-clamping device moved in a circular path and further including a cam guide.

Referring first to FIG. 1, the embodiment of the invention shown therein represents a particularly advantageous design of a portable drill-grinding machine, which is very compact. This machine has a machine frame 1 which is U-shaped. A motor 3, carrying a grinding disc 4, is arranged in base 2 of the U-shaped frame and perpendicularly thereto. Grinding disc 4, which is positioned inside of the U-shaped frame, has the form of a truncated cone in which half the included angle of the cone is equal to the complementary half of the included angle of the point of the drill to be ground.

The legs 5 and 6 of U-shaped frame 1 carry a feeding device 7. Device 7 has a rocking lever 8 one arm of which is mounted, for pivotal movement of the lever, on a bolt 9 secured in leg 6, and also for displacement in a direction parallel to the axis of pivoting or rotation. The free arm of lever 8 carries a clamping device or chuck 10 for the drill 11 which is to be ground. On the pivotally mounted arm of rocking lever 8, there is secured a stirrup 12 which extends toward the other leg 5 of frame 1 and which is pivotally mounted on leg 5 by means of a bolt 13 which is coaxial with bolt 9. Feeding device 7 is prestressed by a coil spring 14 seated in a bore receiving the bolt 13 and designed as a blind bore. The prestressing is in a direction opposite to the positioning direction of the clamping device 10 relative to grinding disc 4. A handle 15, for operating the feeding device, is secured to stirrup 12.

Feeding device 7 is provided with a guide assembly 16 comprising a guide cam 17, arranged on rocking lever 8, and a stop 18. Guide cam 17 is preferably either adjustable or exchangeable, or both, so that different types of relief grinding can be produced in dependence on the setting and/or selection of guide cam 17. For this purpose, guide cam 17 is formed with oblong slots 17a and is secured on rocking lever 8 by means of screws 17b extending through the slots. Through a follower 17d, an adjusting screw 17c engages an opening 17e in guide cam 17, and serves to adjust guide cam 17 when screws 17b are loosened. Stop 18 is part of a positioning device 19, secured in leg 6 of machine frame 1, for positioning clamping device 10 with respect to grinding disc 4. Stop 18 can be extended and retracted by means of a hand-operated adjusting device 20.

Clamping device 10 comprises either a two-jaw chuck or a multiple-jaw chuck, and is secured on rocking lever 8 for rotation about the chucking axis. A releasable locking device 21 which is exchangeable or adjustable, assures that clamping device 10 is set, after turning through an angle of 360° / number of lips of drill, for example, 180° for a two-lip drill. Consequently, two-lip, three-lip, or four-lip drills also can be ground.

In the embodiments illustrated in the drawings, the axis of rotation of feeding device 7 intersects the axis of grinding disc 4 and extends perpendicularly to the latter. The traversing range of feeding device 7 preferably is 90°. As a rule, the axis of clamping device 10 or the axis of drill 11 to be ground are turned only so far as to intersect the axis of grinding disc 4 in operating position. For the production of a negative clearance angle, however, the feeding device can be moved beyond the intersection of the axes of the drill and of the grinding disc In drills with a left-hand twist, the feed to the grinding disc generally is effected from the bottom, and thus from a starting position displaced by 180°, for example, from the illustrated starting position.

Preferably, the drill-grinding machine is provided with a vertical adjustment means 35, by means of which the initial vertical position of drill 11, with respect to grinding disc 4, can be adjusted. This vertical adjustment device comprises a screw bearing against machine frame 1. With this vertical adjustment device, it is possible to vary the relief-ground surface to an even greater extent. By varying the vertical position between a first grinding operation and a second grinding operation, it is possible, for example, to obtain a two-face cut.

The drill-grinding machine furthermore is provided with an aligning device 22 having a stop 23, that can be turned into the receiving position of clamping device 10.

The manner of operation of the drill-grinding machine will now be described. Clamping device 10 is turned, by means of feeding device 7, into receiving position and a drill 11, to be ground, is inserted into the clamping device 10. Then aligning device 22 is angularly displaced into the range of the receiving position, and the drill is guided on stop 23 and turned so that its cutting lips are at least substantially perpendicular to grinding wheel 14. Drill 11 then is clamped, and turned by means of feeding device 7 toward grinding disc 4 in an operating position corresponding to the illustration in FIG. 1. By means of positioning device 19, drill 11 is moved slowly toward grinding disc 4 until it touches the latter. Then feeding device 7 is slowly extended, with drill 11, by means of the guide assembly 16, being forced to follow the circumference of the grinding disc so as to receive the predetermined relief ground surface set by the guide assembly 16.

The feed device is then returned to approximately the receiving position, and clamping device 10 is angularly adjusted through 180°. If the cutting lips have initially the same length, the grinding of the second cutting lip and of the relief grinding surface can be effected immediately without changing position, to which end feeding device 7 is slowly retracted. If the cutting lips are not of the same length, positioning device 19 must, at first, be somewhat more retracted, and drill 11 must be fed to the feeding device in the operating position.

The cutting lips can be checked for equal length in a simple manner by selecting an extremely small grinding depth and determining, by ear, whether the grinding depth is the same on the other cutting lip after the clamping device 10 has been turned through 180°.

The drill-grinding machine shown in FIG. 2 is substantially the same as that shown in FIG. 1, with the exception that guide assembly 16' is no longer a cam-type guide but is rather a crank drive 24. For this purpose, stop 18' of positioning device 19' is lengthened. At the free end of stop 18', there is articulated a telescopic rocker arm 25 which is secured on rocking lever 8 by means of a joint 26 which is preferably a ball and socket joint. The telescopic design of rocker arm 25 is effective during the turning of the feeding device from the receiving position to a point short of the position in which the drill axis strikes the plane of grinding disc 4. From this position to the operating position of the feeding device, the retractable part of rocker arm 25 bears on a stop in the other part of rocker arm 25, and rocker arm 25 guides clamping device 10 and the drill 11 along the circumference of grinding disc 4.

In order to change the form of the relief-ground surface of a drill to be ground, the transmission ratio of the crank drive preferably is made variable. To this end, the stop in one part of rocker arm 25 preferably is made adjustable. In addition, the drill-grinding machine shown in FIG. 2 is provided with a vertical adjustment 35. Unlike the arrangement of the prestressed spring 14 in the embodiment of the invention shown in FIG. 1, the prestressed spring 14' of the machine shown in FIG. 2 is so arranged that it opposes the stop 18' of the guide assembly in the feeding direction. The method of operation of the machine shown in FIG. 2 corresponds to that of the machine shown in FIG. 1.

I claim:

1. In a drill-grinding machine, particularly for grinding spiral drills, of the type including a machine frame, a rotatable grinding wheel and a feeding device, with the feeding device including a rockable lever which is rockable about an axis extending at an angle to the axis of the grinding wheel and toward the grinding wheel, and further including a chuck at one end of the rocking lever, the rocking lever being coupled with a guiding device in a manner such that the drill end to be ground is fed toward the grinding disc and is relief-ground by leading it along the grinding disc: the improvement comprising, in combination, said chuck having an axis which is parallel to the axis of said rocking lever; said rocking lever being movable axially of its axis; spring means biasing said rocking lever axially of its axis away from said grinding disc, said rocking lever being movable toward said grinding disc against the bias of said spring means; and a guide assembly, including a fine feeding screw, interposed between said frame and said rocking lever; said grinding disc having a peripheral grinding surface; said guide assembly, through said fine feeding screw and said rocking lever, controlling feeding of the drill end to be ground toward the peripheral grinding surface of said grinding disc and guiding of the drill end to be ground along said peripheral grinding surface.

2. In a drill-grinding machine, the improvement claimed in claim 1, in which said chuck is angularly adjustable about its axis; and detent means releasably retaining said chuck in each of two angular positions spaced by 180°.

3. In a drill-grinding machine, the improvement claimed in claim 1, in which said guide assembly is formed with a guide path positioned between said machine frame and said rocking lever, said guide path being cooperable with said fine feeding screw.

4. In a drill-grinding machine, the improvement claimed in claim 1, in which said grinding disc has peripheral grinding surface which is the surface of a truncated cone half of whose apex angle is equal to the complementary angle of half the included point angle of the drill; said feeding device oriented relative to said grinding disc that the drill extends parallel to an end face of said grinding disc 5. In a drill-grinding machine, the improvement claimed in claim 1, including an adjusting device operatively associated with said rocking lever and operable to adjust the initial vertical position of a drill with respect to said grinding disc.

6. In a drill-grinding machine, the improvement claimed in claim 3, including a guide cam having a cam surface cooperable with said fine feeding screw.

7. In a drill-grinding machine, the improvement claimed in claim 6, in which said guide cam is one of plural interchangeable guide cams.

8. In a drill-grinding machine, the improvement claimed in claim 6, in which said guide cam is adjustably mounted between said machine frame and said rocking lever.

9. In a drill-grinding machine, the improvement claimed in claim 1, in which said guide assembly comprises a crank drive operable between said machine frame said rocking lever.

10. In a drill-grinding machine, the improvement claimed in claim 9, in which the transmission ratio of said crank drive is variable.

11. In a drill-grinding machine, the improvement claimed in claim 1, in which said machine frame is U-shaped in plan including a rectilinear base portion; a driving motor mounted on said base portion and rotating said grinding disc, said grinding disc being positioned inside said U-shaped machine frame.

12. In a drill-grinding machine, the improvement claimed in claim 11, in which the axis of said rocking lever is perpendicular to the axis of rotation of said grinding disc.

13. In a drill-grinding machine, the improvement claimed in claim 6, in which said guide cam is mounted on said rocking lever.

14. In a drill-grinding machine, the improvement claimed in claim 11, in which said rocking lever is rockable about pivot pins in the respective legs of said U-shaped machine frame; said rocking lever, between, said pivot pins, being designed in the form of a yoke for carrying said drill-grinding machine.